(12) United States Patent
Hoeks et al.

(10) Patent No.: US 10,166,568 B2
(45) Date of Patent: Jan. 1, 2019

(54) ASSEMBLY, IN PARTICULAR A PLAY FOUNTAIN

(71) Applicant: Hoeks Beheer B.V., Baarn (NL)

(72) Inventors: Wilhelmus Adolfus Johannes Marie Hoeks, Baarn (NL); Frits Jan Van Kempen, Amsterdam (NL); Guido William Molenaar, Amersfoort (NL); Frank Van Den Berg, Eindhoven (NL)

(73) Assignee: HOEKS BEHEER B.V., Baarn (NL)

( * ) Notice: Subject to any disclaimer, the term of this patent is extended or adjusted under 35 U.S.C. 154(b) by 193 days.

(21) Appl. No.: 14/779,247

(22) PCT Filed: Mar. 21, 2014

(86) PCT No.: PCT/EP2014/055698
§ 371 (c)(1),
(2) Date: Sep. 22, 2015

(87) PCT Pub. No.: WO2014/147218
PCT Pub. Date: Sep. 25, 2014

(65) Prior Publication Data
US 2016/0052009 A1    Feb. 25, 2016

(30) Foreign Application Priority Data

Mar. 22, 2013    (EP) .................................... 13160685

(51) Int. Cl.
*B05B 12/04*    (2006.01)
*B05B 17/08*    (2006.01)
(Continued)

(52) U.S. Cl.
CPC ............ *B05B 17/08* (2013.01); *A63G 31/007* (2013.01); *B05B 12/04* (2013.01); *F21V 33/008* (2013.01);
(Continued)

(58) Field of Classification Search
CPC ........ B05B 12/04; B05B 17/08; H02J 7/0013; H02J 7/0021; H02J 7/0022; A63G 31/007; F21W 2121/02
See application file for complete search history.

(56) References Cited

U.S. PATENT DOCUMENTS 4,088,880 A * 5/1978 Walsh ..................... F21S 9/02
                                                  239/18
4,705,216 A    11/1987 Kaffka et al.
(Continued)

FOREIGN PATENT DOCUMENTS

CA    2397577 A1    10/2000
CA    2390240       12/2003
(Continued)

OTHER PUBLICATIONS

International Search Report and Written Opinion for corresponding foreign patent application No. PCT/EP2014/055698, filed Mar. 21, 2014.
(Continued)

*Primary Examiner* — Ryan A Reis
(74) *Attorney, Agent, or Firm* — Steven M. Koehler; Westman, Champlin & Koehler, P.A.

(57) ABSTRACT

The invention relates to an assembly, in particular a play fountain, comprising a floor for carrying people, a plurality of electrical devices, such as electric motors coupled to pumps and nozzles for generating jets of liquid, distributed over the area of the floor, and a control system for operating the electrical devices. The assembly comprises a plurality of rechargeable batteries connected to the electrical devices.

19 Claims, 2 Drawing Sheets

(51) Int. Cl.
*A63G 31/00* (2006.01)
*H02J 7/00* (2006.01)
*F21V 33/00* (2006.01)
*F21W 121/02* (2006.01)

(52) U.S. Cl.
CPC .......... *H02J 7/0013* (2013.01); *H02J 7/0022* (2013.01); *F21W 2121/02* (2013.01)

(56) References Cited

U.S. PATENT DOCUMENTS

| | | | |
|---|---|---|---|
| 4,892,250 | A | 1/1990 | Fuller et al. |
| 5,439,170 | A | 8/1995 | Dach |
| 6,758,231 | B1 | 7/2004 | Lochtefeld et al. |
| 7,341,203 | B1 * | 3/2008 | Yeomans ............... B05B 17/08 239/16 |
| 7,748,642 | B1 | 7/2010 | King |
| 9,802,214 | B2 | 10/2017 | Schoeren et al. |
| 2003/0073505 | A1 | 4/2003 | Tracy |
| 2004/0020999 | A1 | 2/2004 | Beidokhti |
| 2005/0248935 | A1 * | 11/2005 | Strip ..................... G06F 1/1601 362/145 |
| 2006/0175424 | A1 | 8/2006 | Tatum |
| 2007/0093306 | A1 | 4/2007 | Magee |
| 2008/0054088 | A1 | 3/2008 | Hanke |
| 2008/0191053 | A1 | 8/2008 | Liao |
| 2011/0174897 | A1 * | 7/2011 | Mai ........................ F21S 9/03 239/18 |
| 2011/0267803 | A1 * | 11/2011 | Farrer .................... F21V 33/00 362/96 |
| 2013/0214056 | A1 | 8/2013 | Schoeren et al. |
| 2013/0320107 | A1 * | 12/2013 | Yeiser, IV .............. B05B 17/08 239/17 |

FOREIGN PATENT DOCUMENTS

| | | |
|---|---|---|
| CN | 201399418 Y | 2/2010 |
| CN | 202105760 U | 1/2012 |
| DE | 102007043021 A1 | 3/2009 |
| DE | 202009007786 | 8/2009 |
| EP | 0318410 | 5/1998 |
| EP | 1898087 A2 | 3/2008 |
| FR | 2874337 | 2/2006 |
| FR | 2902901 | 12/2007 |
| JP | 63283775 | 11/1988 |
| JP | H03186373 A | 8/1991 |
| JP | H04-82700 | 3/1992 |
| JP | 0532112 | 5/1993 |
| JP | 93-19820 | 7/1993 |
| JP | 6091063 | 4/1994 |
| JP | H06-39155 | 5/1994 |
| JP | 2509262 | 6/1996 |
| JP | 2001070852 A | 3/2001 |
| JP | 2002-301410 | 10/2002 |
| SU | 1496831 A1 | 7/1989 |
| WO | 198801541 A1 | 3/1988 |
| WO | 2009033685 | 3/2009 |
| WO | 2012003951 A2 | 1/2012 |
| WO | WO-2012003951 A2 * | 1/2012 ............. B05B 17/08 |

OTHER PUBLICATIONS

Office Action for Japan Patent Application No. 2016-504592, dated Oct. 3, 2016.
Russian Office Action dated Mar. 10, 2017 for corresponding Russian Patent Application No. 2015143013, filed Mar. 21, 2014.
Office Action from Mexican Trademark Office for Mexican Patent Application No. MX/a/2015/013523, filed Mar. 21, 2014, dated Sep. 14, 2018.
Communication from the European Patent Office for European Patent Application No. 14711761.8, dated Oct. 1, 2018.

* cited by examiner

ASSEMBLY, IN PARTICULAR A PLAY FOUNTAIN

CROSS-REFERENCE TO RELATED APPLICATION

The present application is a national stage filing of International patent application Serial No. PCT/EP2014/055698, filed Mar. 21 2014, and published as WO 2014/147218 A1 in English.

BACKGROUND

The discussion below is merely provided for general background information and is not intended to be used as an aid in determining the scope of the claimed subject matter.

The invention relates to an assembly, in particular a play fountain, comprising a floor for carrying people, a plurality of electrical devices, such as pumps connected to nozzles for generating jets of liquid, in particular water, and/or lights, distributed over the area of the floor, and a control system for operating the electrical devices.

Play fountains are known. The nozzles are typically accommodated in the floor of the assembly and are arranged to jet liquid up into the air. With such an assembly a lively and variable and thus fascinating and visually attractive appearance or show can be realised, to which end the various liquid jets are turned on and off to generate a specific pattern and/or rhythm and possibly even varied in height.

WO 2012/003951 discloses a play fountain comprising a floor (1), a plurality of nozzles (2), preferably a reservoir for a liquid, in particular water, or means to connect the assembly to a liquid supply, and a control system (3) for controlling one or more of the nozzles (2) during operation of the assembly. The floor (1) is assembled modularly.

Electrical power consumed by assemblies such as play fountains and dance floors fluctuates e.g. with the number of jets and/or lights that are activated simultaneously and substantial peaks in e.g. power or current are likely to occur, requiring a high current power supply and heavy cables. Also, high voltages may form a risk to users.

SUMMARY

This Summary and Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

Aspects of the invention can provide an assembly, such as a play fountain or dance floor, with improved electric power management and/or improved safety.

To this end, the assembly comprises a plurality of rechargeable batteries connected to the electrical devices. By supplying electrical power from batteries, peaks in e.g. power or current can be dealt with and/or operating voltage can be kept relatively low, e.g. at or below 12 Volt.

In an embodiment, the assembly comprises a power source, such as a (diesel)generator, or a connector for connecting the assembly to a power source, such as the mains, and at least one transformer to reduce the voltage of the electricity to 15 Volt or less, preferably to a voltage in a range from 5 to 13 Volt, e.g. 12 Volt. In another embodiment, the batteries, e.g. lead-acid batteries or lithium ion batteries, have a capacity of at least 6 Ah, preferably a capacity in a range from 12 to 96 Ah, and/or an output voltage of 15 Volt or less, preferably an output voltage in a range from 5 to 13 Volt, e.g. 12 Volt.

In another embodiment, the assembly comprises at least one charger connected to one or more of the batteries and connected or connectable to a power source. In a refinement, the control system is connected, directly or indirectly, to the batteries and arranged to charge the batteries when the electrical device(s) connected to the batteries is (are) off, i.e. not energized. Thus, the batteries are recharged while the assembly is being used and the risk of depleting one or more batteries is reduced and/or lower capacity (smaller) batteries can be employed. In a refinement, the charger or control system is arranged to charge the respective batteries at a current that is at least four times, preferably at least ten times lower that the maximum current (latently) required by the electric devices connected to the respective battery. In a further refinement, the charge rate is adjusted to the expected average power consumption, e.g. during a day and preferably such that the state of charge of the batteries is maintained above 50% (batteries at least half full).

In an embodiment, the control system is arranged to operate the electrical devices to generate a succession of different patterns, e.g. moving walls or changing mazes of liquid jets on a play fountain or colourful light patterns on a play fountain or dance floor. FIGS. 18 to 24 of WO 2012/003951 show various games that can be played with the play fountain according to the present invention. In a refinement, the patterns are selected such that, averaged over a predetermined period of time, e.g. a day or one or more hours, the load is evenly distributed over the batteries e.g. with at least 80% of the batteries remaining within ±20% of the average state of charge of the batteries.

In another embodiment, the state of charge of the batteries is maintained between a pre-selected minimum value and a pre-selected maximum value. If the state of state of charge is too low or nearly too low, the electrical devices coupled to the respective battery are e.g. not used or used less. If the state of state of charge is too high or nearly too high, the electrical devices are e.g. not recharged or use of the devices coupled to the respective battery is increased.

In another embodiment, the control system is arranged to regularly or constantly establish the state of charge of the batteries, e.g. by measuring one or more parameters, e.g. voltage or current (integrated in time), of the batteries indicative of said state or by storing information on the total power consumption of the electrical devices connected to each of the batteries. In a refinement, the control system is arranged to select patterns from a database of generate patterns in situ. In a further refinement, the control system is arranged to weigh the state of charge of the batteries when selecting or generating patterns, e.g. to save batteries with a relatively low charge or to put a higher load on batteries with a relatively high charge.

In an embodiment, the electrical devices include electric motors coupled to pumps and nozzles for generating jets of liquid and/or the electrical devices include lights. In another embodiment, at least the battery is housed in a waterproof casing.

In another embodiment, the floor comprises a plurality of mutually detachable floor modules comprising at least one electrical device, such as an electric motor or a light, and a battery connected to the electrical device. Owing to this modularity, the assembly, e.g. a play fountain, can be installed temporarily, e.g. during events or for a few months in summer, and the size and shape of the floor can be varied, e.g. may comprise only three rows and columns, 3×3, with one electrical device in each module or be considerably larger comprising ten or twenty rows and columns, 10×10 or 20×20, with e.g. four, five, or nine electrical device in each module. Configurations can be easily adapted to space available and to the wishes of the users. In one preferred embodiment the modular floor comprises at least 8×8 modules. In a refinement, the modules are adjustable for height and levelness.

In a further embodiment, the assembly comprises a reservoir that is positioned underneath the floor and that preferably extends underneath the entire floor. Thus, the individual pumps need only suck the liquid from the reservoir and deliver it to the nozzles over a relatively short distance, which benefits simplicity and the speed at which the liquid jet can be controlled for each nozzle.

The invention further relates to a method of operating an assembly as described above, characterised in by generating a succession of different patterns such that, averaged over a predetermined period of time, the load is evenly distributed over the batteries, preferably with at least 80% of the batteries remaining within ±20% of the average state of charge of the batteries.

Another embodiment is characterised by selecting a minimum value of the state of charge of the batteries, selecting a maximum value of the state of charge of the batteries, maintaining the state of charge between these values.

BRIEF DESCRIPTION OF THE DRAWINGS

Aspects of the invention will be explained in more detail hereinafter by means of the Figures.

DETAILED DESCRIPTION OF THE ILLUSTRATIVE EMBODIMENTS

Figure 1:
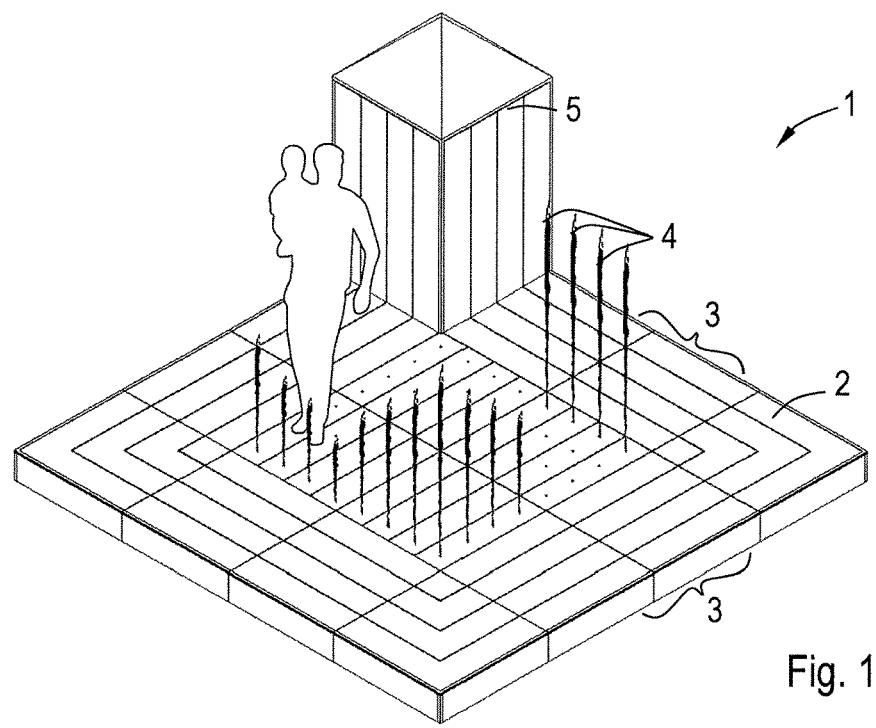
FIG. 1 is a perspective view of a modular play fountain.

FIG. 1 is a perspective view of a modular play fountain 1. The play fountain comprises a floor 2 in turn comprising a plurality of mutually detachable floor modules 3 arranged in a plurality of rows and columns, e.g. 4×4 (FIG. 1) or 10×10.

A reservoir (not shown) for a liquid, in particular water, extends underneath substantially the entire floor. Each of the center modules 3 comprises a plurality of pumps and nozzles for generating jets 4 of water, a battery, and a (sub) controller for operating the pumps and charging the battery. The outer modules provide an entrance to the play fountain and a retreat for those who leave the center modules. Further the outer modules collect water falling on the floor, i.e. reduce loss of water along the boundaries of the play fountain. In this example, the play fountain comprises a service module 5 containing system for treating, e.g. filtering, the water in the reservoir, maintaining a suitable water level, e.g. by means of a floater, and a connection to the water mains, a control system for operating the pumps and nozzles, and transformers, as will be explained below.

Figure 2:
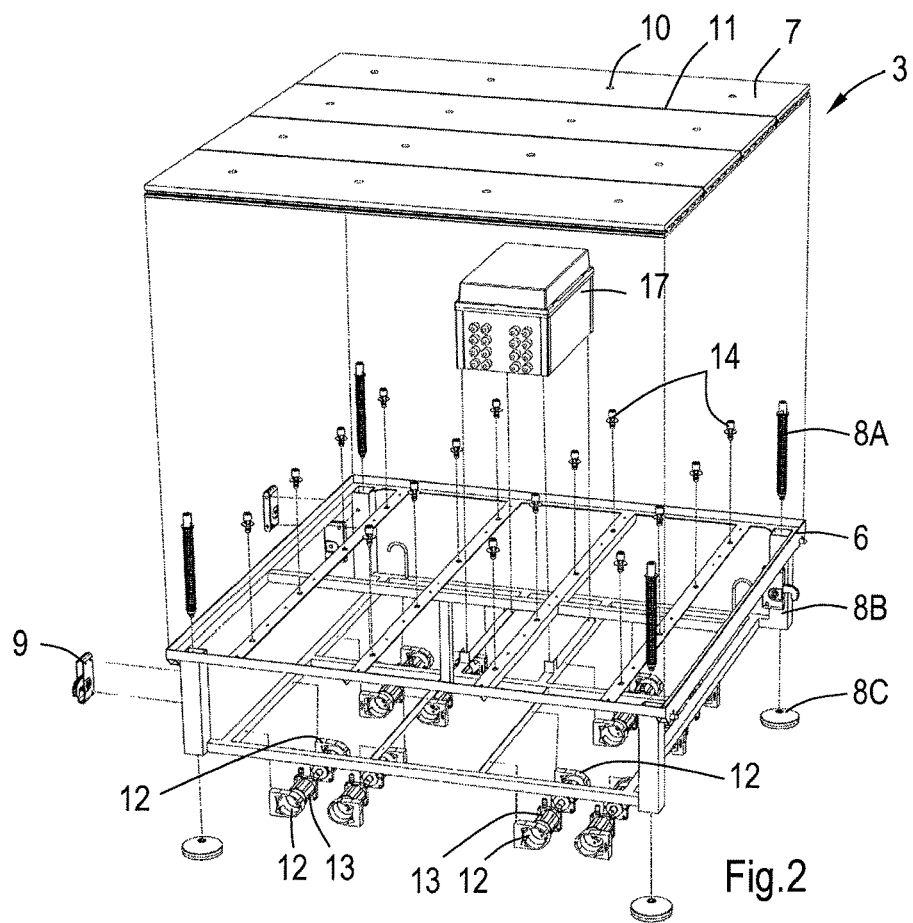
FIG. 2 is an exploded view of a module used in the play fountain shown in FIG. 1, the module comprising an accumulator.

As shown in FIG. 2 each of the center modules 3 comprises a frame 6 carrying a floor panel 7 and having adjustable legs 8 to position the floor panel of the modules level and flush with the floor panels of adjoining modules. Connectors, e.g. hooks 9, are mounted on the sides of the frame to facilitate a secure connection between the modules. The floor panel is provided with holes 10 to allow water from the nozzles to pass and channels 11 and further holes (not visible) to drain water returning to the floor.

Sixteen pumps, in this example centrifugal pumps 12, each comprising an electric motor 13, e.g. a brushless motor, are mounted in the lower half, preferably near the bottom, of the frame 6 and in fluid connection with an equal number of nozzles 14 mounted on the frame and in register with holes 10 in the floor panel 7. The pumps are electrically connected via a cable and a (sub)controller 15 to a battery 16 mounted in a waterproof casing 17.

Figure 3:
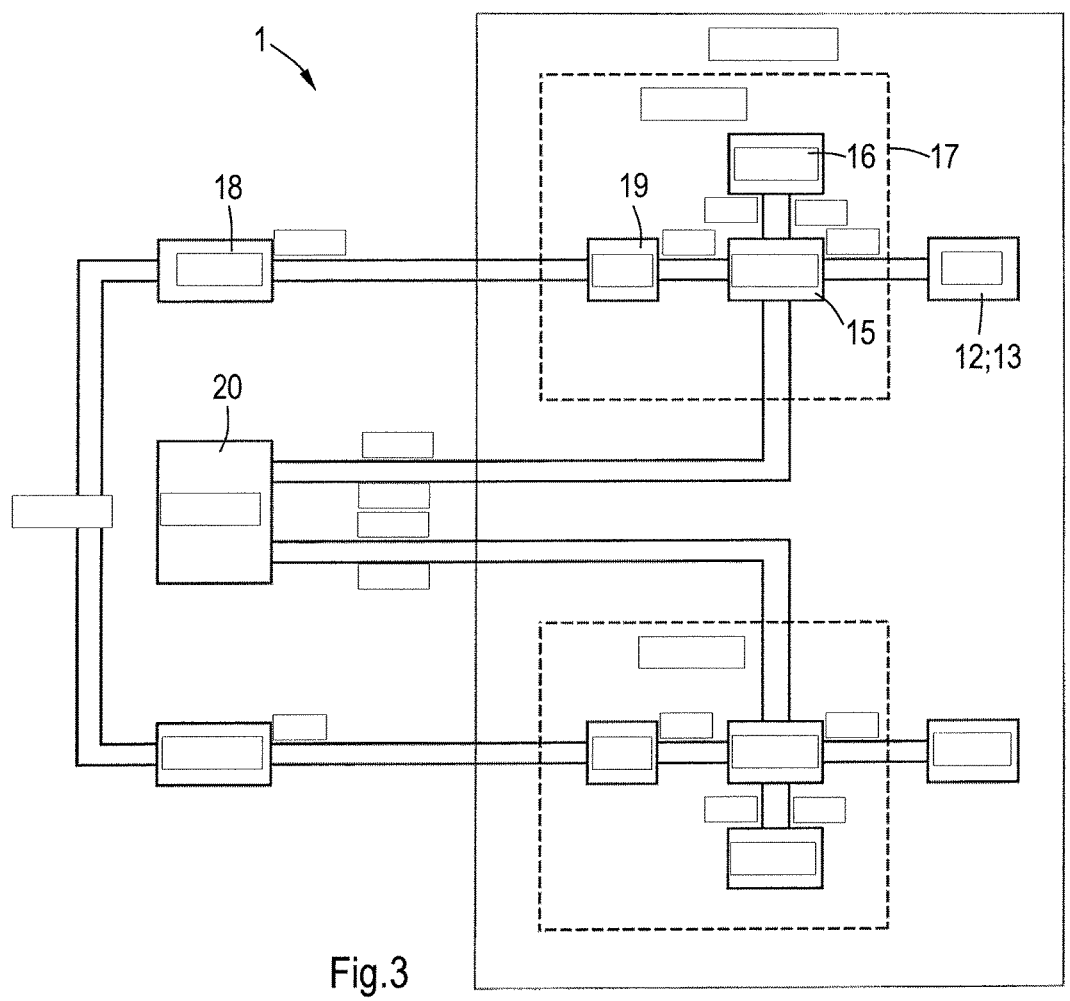
FIG. 3 is an electric diagram of the play fountain shown in FIG. 1 comprising a control system enabling efficient use of the batteries.

FIG. 3 is a schematic diagram of the control and power management system of the play fountain. The play fountain is connected to a power source, such as the mains or a (diesel)generator, and comprises a plurality of transformers 18 to reduce the voltage of the power source, e.g. 230 or 400 Volt to a voltage of 15 Volt or less, e.g. to 12 Volt or 6 Volt. The transformers are electrically connected to a plurality, e.g. eight, of the modules. The power cables enter the waterproof casing 17 and are connected to a booster 19 to increase the voltage to a level higher than that of the battery, e.g. to 15 Volt in case of a 12V battery, to enable charging of the battery.

The system further comprises a main controller 20 that is connected to the (sub)controllers in the modules. The main controller is arranged to operate, via the (sub)controllers, the pumps 12 to generate a succession of different patterns of water jets 4. Further, the system is arranged to charge the batteries 16 when the pumps connected to the batteries are switched off, i.e. not energized.

If each of the modules comprises sixteen 24 W electric motors and the assembly is operated at 12 V, activating all pumps/nozzles in one module requires a current of ((24/12)×16=) 32 A. If the assembly comprises 8×8 modules, a peak of several hundred Ampere or more could occur. The present assembly allows for such peaks also when it is connected to a power supply of e.g. 60 or 100 Ampere. Moreover, recharging can be carried out at relatively low currents e.g. 1 or 2 A per module.

In an example, the main controller 20 is programmed to operate the play fountain with a succession of different patterns selected that, averaged over a selected period of time, e.g. a day or one or more hours, load the batteries evenly, e.g. with all batteries remaining within ±20% of the average state of charge of the batteries.

In another example, the assembly comprises a wireless connection, e.g. wifi, between the subcontrollers the modules and the main controller 20.

The present invention provides a safe assembly, e.g. a play fountain, and efficacious management of electric power. The invention is not limited to the embodiments described above, which can be varied in a number of ways within the scope of the claims. E.g., instead of or in addition to the pumps and nozzles the floor can be provided with lights to provide a dance floor or a combination play fountain and dance floor.

What is claimed is:

1. An assembly, comprising:
   a floor configured to support people;
   a plurality of electrical devices including electric motors coupled to pumps and nozzles configured to generate jets of liquid, distributed over the floor;
   a plurality of rechargeable batteries, each rechargeable battery connected to one or more of the electric motors;

at least one charger connected to one or more of the plurality of rechargeable batteries and configured to connect to a power source; and a control system configured to operate the plurality of electrical devices and the at least one charger.

2. The assembly according to claim 1 and further comprising a transformer to reduce voltage of electricity from a power source to 15 volts or less.

3. The assembly according to claim 1, the plurality of rechargeable batteries each having a capacity of at least 6 Ah, and/or an output voltage of 15 volts or less.

4. The assembly according to claim 1, wherein the control system is arranged to charge the plurality of rechargeable batteries when an electrical device connected to the plurality of rechargeable batteries is switched off.

5. The assembly according to claim 1, wherein the control system is arranged to operate the plurality of electrical devices to generate a succession of different patterns of jets of liquid selected such that, averaged over a predetermined period of time, a load is evenly distributed over the plurality of rechargeable batteries.

6. The assembly according to claim 1, wherein the control system is arranged to operate the plurality of electrical devices to generate a succession of different patterns of jets of liquid and wherein a state of charge of the plurality of rechargeable batteries is maintained between a pre-selected minimum value and a pre-selected maximum value.

7. The assembly according to claim 1, wherein the control system is arranged to establish a state of charge of the plurality of rechargeable batteries.

8. The assembly according to claim 1, wherein the plurality of electrical devices further include lights.

9. The assembly according to claim 1, wherein the floor comprises a plurality of mutually detachable floor modules, and a floor module of the plurality of mutually detachable floor modules comprising an electrical device of the plurality of electrical devices and a battery of the plurality of rechargeable batteries connected to the electrical device.

10. The assembly according to claim 9, wherein each of the plurality of mutually detachable floor modules is adjustable for height and/or levelness.

11. The assembly according to claim 1, wherein each of the plurality of rechargeable batteries is housed in a waterproof casings.

12. The assembly according to claim 9, wherein the plurality of mutually detachable floor modules and/or the nozzles are provided in a two-dimensional pattern including a grid comprising a plurality of rows and columns of the plurality of mutually detachable floor modules and/or the nozzles.

13. A method of operating an assembly, the assembly comprising:
a floor configured to support people;
a plurality of electrical devices including electric motors coupled to pumps and nozzles configured to generate jets of liquid, distributed over the floor;
a plurality of rechargeable batteries, each rechargeable battery connected to one or more of the electric motors;
at least one charger connected to one or more of the plurality of rechargeable batteries and configured to connect to a power source; and
a control system configured to operate the plurality of electrical devices and the at least one charger;
the method comprising:
generating a succession of different patterns of jets of liquid such that, averaged over a predetermined period of time, a load is evenly distributed over the plurality of rechargeable batteries.

14. A method of operating an assembly, the assembly comprising:
a floor configured to support people;
a plurality of electrical devices including electric motors coupled to pumps and nozzles configured to generate jets of liquid, distributed over the floor;
a plurality of rechargeable batteries, each rechargeable battery connected to one or more of the electric motors;
at least one charger connected to one or more of the plurality of rechargeable batteries and configured to connect to a power source; and
a control system configured to operate the plurality of electrical devices and the at least one charger;
the method comprising:
selecting a minimum value of a state of charge of the plurality of rechargeable batteries;
selecting a maximum value of the state of charge of the plurality of rechargeable batteries; and
maintaining the state of charge between the minimum value and the maximum value.

15. The method according to claim 13, wherein the plurality of rechargeable batteries remain within ±20% of an average state of charge.

16. The assembly according to claim 1 and further comprising a reservoir that is positioned underneath the floor.

17. The assembly according to claim 16, wherein the reservoir extends underneath the floor entirely.

18. The assembly according to claim 9 and further comprising a reservoir that is positioned underneath the floor.

19. The assembly according to claim 18, wherein the reservoir extends underneath the floor entirely.

* * * * *